May 27, 1958   A. J. JOHNSON   2,836,029
LAWN MOWER CUTTING BLADE
Filed Oct. 25, 1956

INVENTOR
A. J. JOHNSON
BY Kimmel & Crowell
ATTORNEYS

United States Patent Office 2,836,029
Patented May 27, 1958

2,836,029

LAWN MOWER CUTTING BLADE

Alexander John Johnson, Eugene, Oreg.

Application October 25, 1956, Serial No. 618,349

1 Claim. (Cl. 56—295)

The present invention relates to lawn mower blades, and more particularly to lawn mower blades of the rotary blade type.

A primary object of the invention is to provide a rotary blade for lawn mowers having vacuum creating blower elements combined therewith.

Another object of the invention is to provide a lawn mower blade of the class described above in which the cutting blade serves as a blowing blade to move the cuttings from the blade into a collection receptacle.

Other objects and advantages will become apparent in the following specification when considered in the light of the attached drawings, in which.

Figure 1:
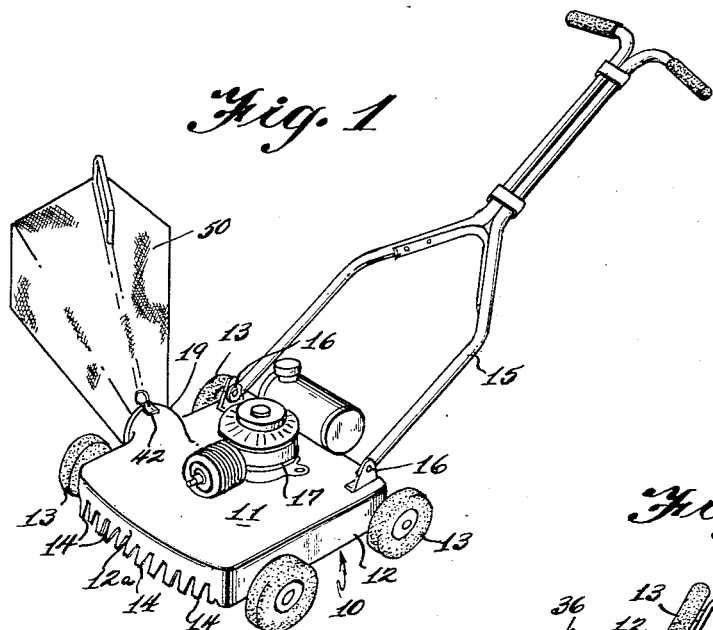
Figure 1 is a perspective view of a lawn mower incorporating the invention.

Referring now to the drawings in detail wherein like reference characters indicate like parts throughout the several figures, the reference numeral 10 indicates generally a lawn mower constructed in accordance with the invention.

The lawn mower 10 is of the type having a horizontal plate 11 with walls 12, 12a depending therefrom. A plurality of wheels 13 are secured to the walls 12 so as to support the walls 12 and the horizontal plate 11 above the ground. The front wall 12a is provided with a plurality of downwardly projecting teeth 14 to permit the passage of grass therethrough. A rearwardly and upwardly extending handle 15 is pivotally secured to the horizontal plate 11 at 16. A gasoline engine 17 is secured to the plate 11 and has a shaft 18 projecting downwardly through the plate 11 in a conventional manner.

The plate 11 is provided with an outlet conduit 19 opening through one of the side walls 12 to permit cut material to be expelled from under the lawn mower 10. An elongated generally flat cutting blade generally indicated at 20 is provided with a central bore 21 which is adapted to engage over the shaft 18 of the gasoline engine 17 and to be secured thereon by any suitable means, such as a nut (not shown).

Figure 4:
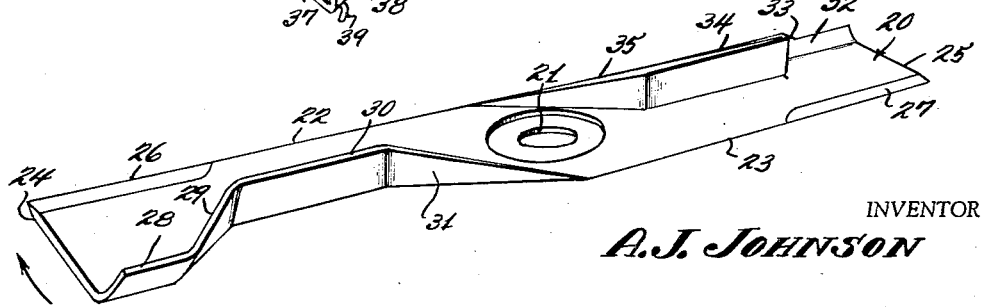
Figure 4 is an enlarged perspective view of the cutting blade shown in erect position detached from the lawn mower.

The blade 20 has longitudinally extending opposite side edges 22 and 23 having a portion adjacent opposite end edges 24 and 25 sharpened at 26 and 27 to provide a cutting portion thereon. The edge 23 of the blade 20 opposite the sharpened edge 26 at the end 24 is arcuately offset upwardly at 28 to provide a fan blade for moving air upwardly with relation to the blade 20. The edge 23 is then flared at 29 toward the cutting edge 26 at an angle, as seen in Figure 4, to provide a propelling means for air in a radially outward direction with respect to the blade 20.

The edge 23 of the blade 20 is formed as a continuation 30 of the flared portion 29 and extends parallel to the edge 22 perpendicular to the blade 20 to provide an additional means for forcing air upwardly from the blade 20. The blade 20 further has a tapered offset portion 31 extending from the continuation 30 to the flat portion of the side edge 23 to serve as a brace to stiffen the blade 20 during its cutting action.

The blade 20 opposite the cutting edge 27 at the end 25 is provided with a reversed duplicate structure to that of the other end of the blade 20 and has an upwardly flared portion 32, an inwardly flared portion 33, a parallel edge portion 34, and a bracing edge portion 35, all acting identically to their counterparts at the opposite end of the blade 20.

A collection receptacle generally indicated at 36 is provided with an entrance opening defined by a U-shaped cylindrical rod 37 having the lower end portions thereof connected by a transverse cross member 38. Hooks 39 and 40 are secured to the cross member 38 and extend transversely thereof for engaging the lawn mower 10 to secure the receptacle 36 thereto. A detent 41 is secured to and extends upwardly from the upper end of the U-shaped rod 37 and is adapted to be engaged by a spring retainer 42 secured to the outlet conduit 19, as shown in Figure 1.

Figure 3:
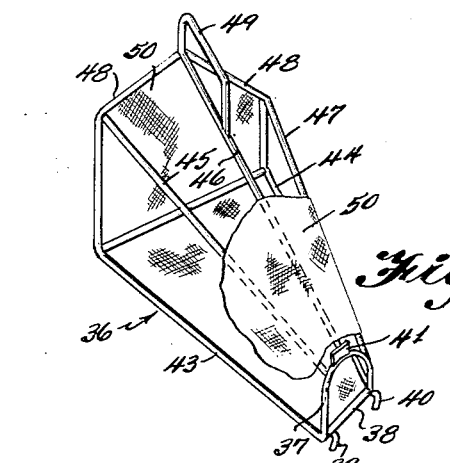
Figure 3 is an enlarged perspective view, with parts broken away, of the collection receptacle.

A plurality of outwardly diverging rods 43, 44, 45, 46 and 47 each have one end secured to the U-shaped rod 37 and their opposite ends secured to a peripheral frame member 48, as best seen in Figure 3. A loop handle 49 extends parallel to and has its opposite ends attached to the rod 46, as is also shown in Figures 1 and 3. Porous cloth 50 of a nature similar to "gunny sack" is secured to the container 36 in any suitable manner such as sewing, and closes the container 36 with the exception of the entrance opening.

Figure 2:
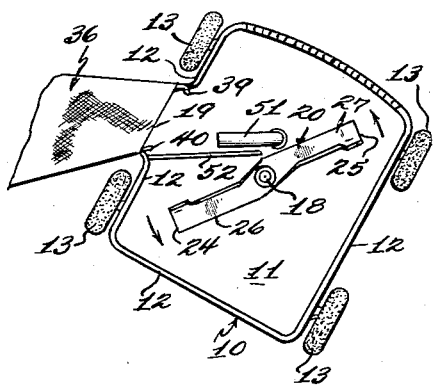
Figure 2 is a fragmentary bottom plan view of the lawn mower illustrated in Figure 1.

In the use and operation of the invention, the engine 17 is operated rotating the blade 20 in a counterclockwise direction, as viewed in Figure 2, simultaneously cutting grass and blowing air outwardly from under the horizontal plate 11 into the container 36. The air passes through the cloth 50 and the grass clippings severed by the blade 20 are trapped in the container 36 until it has become filled. The container 36 is then disconnected from the lawn mower 10 and emptied whereupon it is reattached for service.

An exhaust pipe 51 extending from the engine 17 through the plate 11 is arranged to direct the exhaust gases outwardly through the conduit 19 into the container 36 so that the additional force exerted thereby will be utilized in directing the grass clippings into the container 36. A partition wall 52 extending across the underside of the wall 11 directs the grass clippings and air outwardly through the exit conduit 19 into the container 36.

It should be understood that the cutting edges 26 and 27 may be made as separate pieces for attachment to the blade 20 by any suitable means.

Having thus described the preferred embodiment of the invention, it should be understood that numerous structural modifications and adaptations may be resorted to without departing from the scope of the appended claim.

What is claimed is:

A blade for a power mower of the rotary type comprising a horizontal elongated flat plate, said plate having longitudinally extending partially flat opposite side edges and transversely extending opposite end edges, said plate having a vertical bore extending therethrough intermediate the opposite end edges thereof, a cutting edge formed on the end portion of one of said side edges adjacent one of said end edges, a second cutting edge formed on the end portion of the other of said side edges adjacent the other of said end edges, an arcuately upwardly offset fan blade integrally formed on the end portion of said one side edge adjacent said other end edge, an arcuately upwardly offset fan blade integrally formed on the end portion of said other side edge adjacent said one end edge, said fan blades each extending parallel to the cutting edge adjacent thereto, an upwardly offset flared portion integrally formed on said other side edge and integrally extending at an angle from the fan blade thereon, an upwardly offset flared portion integrally formed on said one side edge and integrally extending at an angle from the fan blade thereon, said flared portions serving as additional fan blades to move air radially outwardly of said flat plate, an integral upwardly offset portion formed on said other side edge integrally extending from the flared portion thereon parallel to said one side edge, an integral upwardly offset portion formed on said one side edge integrally extending from the flared portion thereon parallel to said other side edge, a tapered offset stiffening member integrally formed on said other side edge integrally extending from the offset portion thereon to the flat portion of said other side edge, and a tapered offset stiffening member integrally formed on said one side edge integrally extending from the offset portion thereon to the flat portion of said one side edge, said flat plate on rotation producing upwardly and outwardly flowing air streams and providing a vacuum beneath said plate.

References Cited in the file of this patent

UNITED STATES PATENTS

| | | |
|---|---|---|
| 1,622,611 | Sera | Mar. 29, 1927 |
| 2,071,872 | Cockburn | Feb. 23, 1937 |
| 2,669,084 | Warren | Feb. 16, 1954 |
| 2,721,438 | O'Maley | Oct. 25, 1955 |
| 2,724,229 | Graham | Nov. 22, 1955 |
| 2,737,003 | Beers | Mar. 6, 1956 |
| 2,779,146 | Mitchell et al. | Jan. 29, 1957 |